June 12, 1956 L. A. HOROWITZ ET AL 2,750,496

V. H. F.-U. H. F. RECEIVER HAVING LOCAL OSCILLATOR CONVERTIBLE TO AN I. F. STAGE

Filed March 31, 1955 2 Sheets-Sheet 1

INVENTOR.
GILBERT C. HERMELING JR
& LEOPOLD A. HOROWITZ

ATTORNEY

June 12, 1956 L. A. HOROWITZ ET AL 2,750,496

V. H. F.-U. H. F. RECEIVER HAVING LOCAL OSCILLATOR CONVERTIBLE TO AN I. F. STAGE

Filed March 31, 1955 2 Sheets-Sheet 2

INVENTOR.
GILBERT C. HRMELING, JR.
& LEOPOLD A. HOROWITZ

H. L. Newton
ATTORNEY

United States Patent Office 2,750,496

Patented June 12, 1956

2,750,496

V. H. F.-U. H. F. RECEIVER HAVING LOCAL OSCILLATOR CONVERTIBLE TO AN I. F. STAGE

Leopold A. Horowitz, Erlton, and Gilbert C. Hermeling, Jr., Collingswood, N. J., assignors to Radio Corporation of America, a corporation of Delaware Application March 31, 1955, Serial No. 498,277

5 Claims. (Cl. 250—20)

Figure 1:
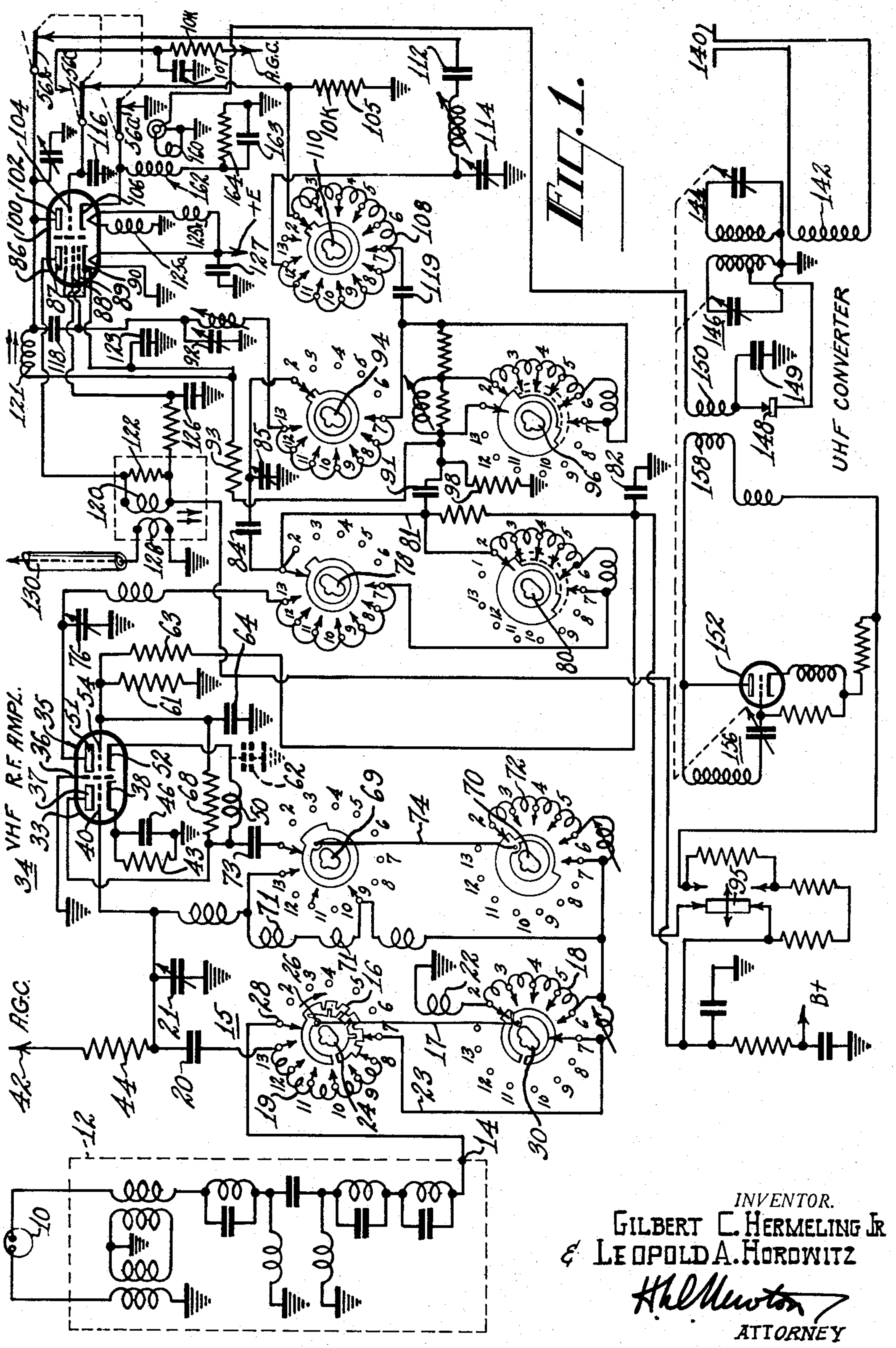

This invention relates to multiband, high frequency signal receivers, and more particularly to tuning systems for television receivers of the type adapted to receive both very high frequency (V. H. F.) and ultra high frequency (U. H. F.) television signals. Still more particularly the invention relates to a tuning system of the type which includes a V. H. F. tuner which is provided with dual purpose signal translating stages which may be selectively adapted to operate as oscillator and mixer respectively for V. H. F. reception, or as amplifiers for intermediate frequency signals derived from a preceding U. H. F. converter for U. H. F. reception.

Under present standards, the broadcast television bands include Channels 2 to 13 which occupy the frequency bands of 54 to 88 megacycles (mc.) and 174 to 216 mc. in the V. H. F. spectrum, and Channels 14 to 83 in the U. H. F. spectrum which occupy the frequency band of 470 to 890 mc. It has been found difficult to provide a single tuner which is commercially adequate to cover all the television channels in both the V. H. F. and U. H. F. television broadcast spectra, and accordingly it is the general practice to provide separate V. H. F. and U. H. F. tuners.

In general, the V. H. F. tuner includes in addition to the tuning or signal selection elements, a radio frequency (R. F.) amplifier for amplifying the received V. H. F. television signals, and mixer and oscillator stages for converting the amplified V. H. F. signals to corresponding intermediate frequency (I. F.) signals. The U. H. F. converter generally comprises in addition to the U. H. F. tuning or signal selection elements, a local oscillator and a crystal mixer for heterodyning the received U. H. F. signals into corresponding intermediate frequency signals. Since commercially satisfactory U. H. F. amplifier tubes are difficult to manufacture and are prohibitive in cost, no R. F. amplifier is provided for the U. H. F. converter. Hence, it is desirable to provide some I. F. amplification of the converted U. H. F. signal prior to its being fed to the television receiver I. F. amplifier, so that the signal input to the television receiver I. F. amplifier may be of the same order of magnitude for U. H. F. as for V. H. F.

Furthermore, since the crystal mixer to a device with a loss rather than a gain, and there is no R. F. amplification of the U. H. F. signal before it is applied to the crystal, it is very desirable that the first I. F. amplifier for the converted U. H. F. signals have a low noise figure because the signal-to-noise ratio of the receiver is dependent to a large degree on the noise figure of the first intermediate frequency amplifier.

To avoid the necessity and expense of providing a separate I. F. amplifier for the U. H. F. converter, it has been the practice to provide circuit connections for switching the V. H. F. R. F. amplifier and the V. H. F. mixer to operate as I. F. amplifiers during U. H. F. reception for amplifying the I. F. signal derived from the U. H. F. converter. The additional switches and circuitry which must be added in order to use the V. H. F. R. F. amplifier as an I. F. amplifier adds more capacity to these critical circuits which impairs the V. H. F. performance.

The V. H. F. R. F. amplifier generally comprises either a driven grounded grid amplifier (a grounded cathode stage driving a grounded-grid stage) which is a low noise high gain amplifier or a pentode amplifier which provides high gain. Since pentodes have a high noise characteristic for high frequency applications, it is not desirable to switch a pentode R. F. amplifier to operate as the first I. F. amplifier for U. H. F. reception. Furthermore when either a pentode or a driven grounded grid stage is used as the U. H. F. I. F. amplifier, and the V. H. F. R. F. amplifier is switched to operate as an I. F. amplifier for the converted U. H. F. television signals, it has been found that undesirable changes occur in the band-pass characteristic of the amplifier as the U. H. F. converter is tuned across its tuning range or as the AGC potentials change with received signal strength, etc.

Although these changes in pass-band characteristics are permissible in some applications such as black and white television, they are undesirable in certain other applications as for example in color television reception.

It is accordingly a primary object of this invention to provide an improved television tuner for reception of V. H. F. television signals which is adapted for use as an intermediate frequency amplifier in connection with a preceding U. H. F. television converter and wherein variations in pass-band characteristics of the television tuner when used as an I. F. amplifier are substantially reduced.

A further object of this invention is to provide an improved television tuner for V. H. F. television signals of the type incorporating a V. H. F. mixer and oscillator, which is adapted for use as a low noise intermediate frequency amplifier for intermediate frequency signals derived from a U. H. F. converter, wherein variations in the band-pass characteristics of the intermediate frequency amplifier with changes in U. H. F. tuning and changes in AGC signals strength and the like are minimized.

A still further object of this invention is to provide an improved V. H. F. tuning system for television receivers and the like of the type adapted for use as an intermediate frequency amplifier in connection with a preceding U. H. F. converter which has a reduced number of circuit components and switching operations, and which may be manufactured in large quantities at low cost. The improved tuning system is adapted to provide dependable and trouble free operation with a minimum of circuit adjustment.

Another object of this invention is to provide an improved television tuner for reception of V. H. F. television signals which is adapted for use as an intermediate frequency amplifier in connection with a preceding U. H. F. television converter wherein no additional switching contacts or circuitry is added to the V. H. F. R. F. amplifier which might otherwise impair the amplifier performance for V. H. F. operation.

In accordance with this invention, a V. H. F. television tuner is provided with a pair of dual purpose signal translating stages which operate respectively as an oscillator and a mixer for V. H. F. reception and as an intermediate amplifier for signals to be derived from the U. H. F. converter. The V. H. F. oscillator which includes a triode electron tube is switched to operate as a grounded grid amplifier for U. H. F. reception. The use of the triode tube provides a low noise amplifier as the first I. F. stage for the converted U. H. F. signals. The U. H. F. converter which includes a crystal mixer is coupled with the cathode of the oscillator stage during U. H. F. reception. It has been found that when a crystal mixer works into a grounded grid stage, the response characteristics are substantially constant as the U. H. F. converter is tuned across the band or as AGC potentials vary with signal strength.

Another feature of the invention includes the stacking of the V. H. F. oscillator and mixer tube whereby a common space current path is provided. The structure uses fewer circuits and circuit components, and also enables the change from oscillator and mixer to I. F. amplifiers with a reduced number of switching operations. Also since the V. H. F. R. F. amplier is not used as an I. F. amplifier for U. H. F., this amplifier has fewer switches and circuitry which would otherwise degrade the performance thereof. A further feature of this invention is the use of a single capacitor connected between the two stages, which serves as an oscillation injection capacitor for V. H. F. reception and as a signal coupling capacitor for U. H. F. reception.

Figure 2:
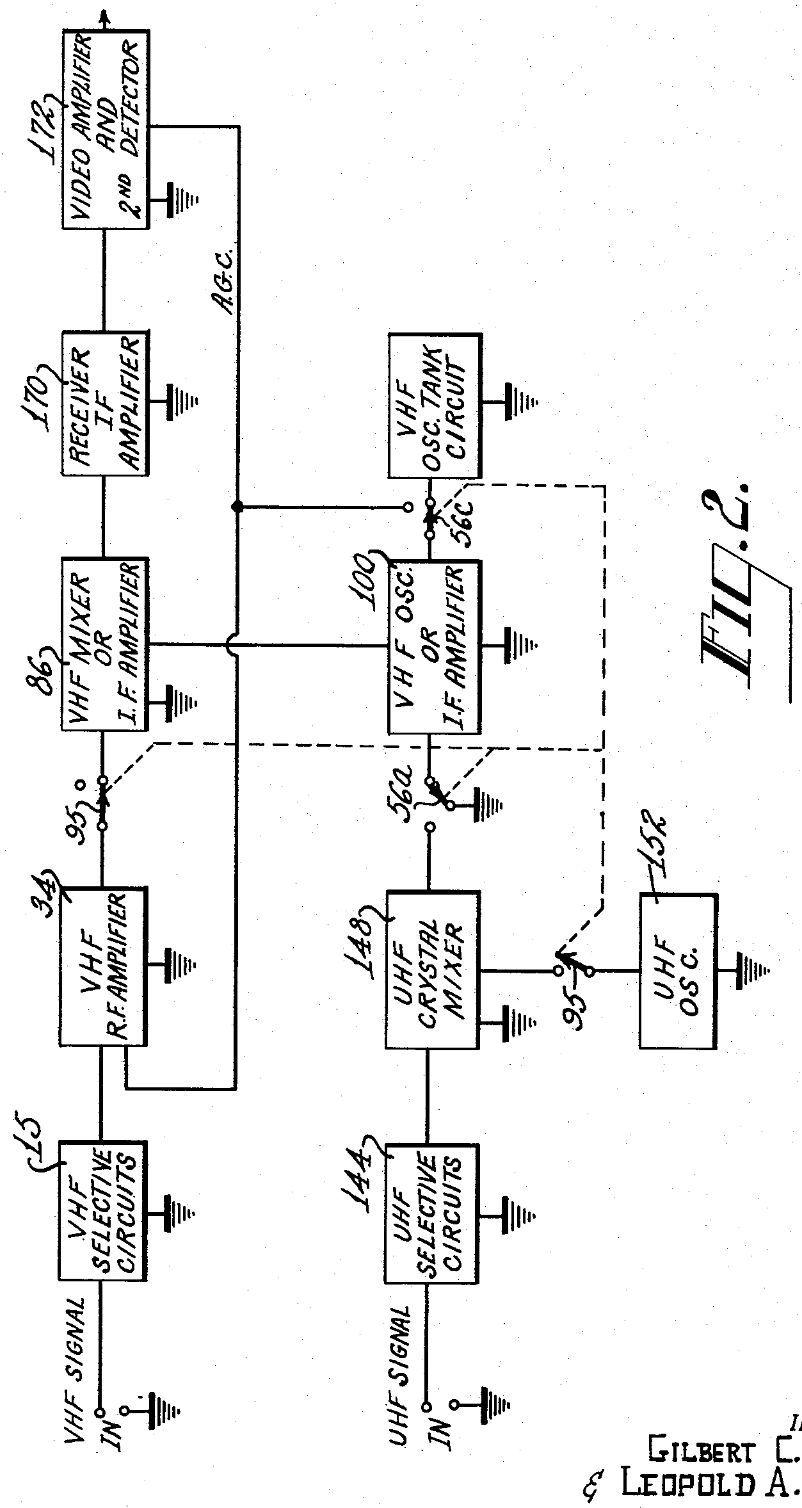

The novel features which are considered characteristic of this invention are set forth with particularity in the appended claims. The invention itself, however, both as to its organization and method of operation, as well as additional objects and advantages thereof, will best be understood from the following description when read in connection with the accompanying drawings in which:

Figure 1 is a schematic circuit diagram of a V. H. F.–U. H. F. television tuning system constructed in accordance with the invention; and Figure 2 is a simplified block diagram of a portion of a television receiver embodying the tuning system of the invention as shown in Figure 1.

Referring now particularly to Figure 1 the V. H. F.–U. H. F. tuning system is connected to derive input signals from an antenna, or other signal source, connected to an input terminal board 10. V. H. F. input signals are passed through a matching transformer and suitable traps or interference attenuation circuits found within the shielded compartment 12.

Thus, filtered input signals arriving at a terminal 14 feed into the V. H. F. signal selection circuits 15 which include the tuning inductors 16 and 18 at the switch sections 24 and 30. The switch sections 24 and 30 are wafer switches having individual inductors between the contact terminals thereof where schematically indicated and are adapted for step-by-step switching in any of 13 different positions (12 V. H. F. positions and 1 U. H. F. position). The high frequency impedance is presented between the terminal 14 and ground by way of the conductor 23 and inductor 22 and essentially comprises the impedance presented by inductance of the slotted rotor of the switch section 24 and is used for tuning the high frequency Channels 7 through 13 by changing the lengths of the slotted rotor presented between the coupling connection 26 and the switch contact 28. For the lower frequency Channels 2 to 6 the high frequency impedance network 16 is shorted out by the conductors 17 and 23, and the overall inductance is determined by the number of series inductors 18 connected in the low frequency network by the switch section 30.

Throughout the discussion of Figure 1 it is to be recognized that each of the switch sections is ganged for unicontrol operation, and that as the rotor elements rotate in a clockwise direction as the channel number increases as is indicated in connection with the arrow at the first mentioned switch section 24. The ganged switches are controlled by a channel selector control which may extend from the front panel of the television receiver and which has one position for each of the V. H. F. television channels and a single position for U. H. F. reception. Although the description herein is directed to a switched inductance type tuner it is understood that the invention is also particularly well adapted for use with turret tuners.

An inductor 19 on the switch section 24 operates to step up the input circuit impedance to match the impedance of a succeeding amplifier tube and is connected to the amplifier input circuit through a coupling capacitor 20. The signal input circuit which is connected to the amplifier control grid 40 therefor includes the variable inductances respectively presented by the inductor 19 and the inductance from the terminal 14 to ground in parallel with the tuning capacitor 21.

The R. F. amplifier for V. H. F. television signals comprises a driven grounded grid amplifier 34 which includes a grounded cathode stage driving a grounded grid stage. For the purposes of this invention, the type of V. H. F. R. F. amplifier used is not important, and the grounded grid amplifier is described by way of example. The separate stages each include a separate triode tube 33 and 35 respectively which may be included in a single envelope 34, such as for example in a 6BQ7A, and which also includes an internal shield 36 to aid in the isolation of the tubes.

The tube 33 is connected as a grounded cathode amplifier and includes an anode 37, a cathode 38 and a control grid 40. An AGC bias potential is connected with the control grid 40 from an AGC terminal 42 by way of a resistor 44. A cathode bias resistor 43 is connected between the cathode 38 and ground to provide additional bias for the tube 33. The cathode 38 is essentially grounded for signal frequencies by a signal bypass capacitor 46.

The tube 35 includes an anode 51, a cathode 52 and a control grid 54. Coupling is provided between the tube 33 and 35 by an inductor 50 which is on the order of .15 microhenry and is connected between the anode 37 of the first triode tube 33 and the cathode 52 of the second triode tube 35. The inductor 50 series resonates with the capacitance 62 which is on the order of 5 micromicrofarads, presented between the cathode 52 of the second triode and the ground. The capacitance 62 represents the input capacitance of the triode 35, and if desired, additional external capacitance may be provided to supplement the inherent input capacitance. The frequency of resonance of this series resonant circuit is preferably within the signal pass-band of the driven grounded grid amplifier, although the circuit is operable if the resonance occurs slightly above the band of frequencies to be amplified. For television receivers adapted to the present United States standards, it is found that optimum performance is obtained when the series resonant circuit is made resonant at the high end of the band, or about Channel 13. The series resonant circuit is effective through a rather broad band of frequencies including the high band Channels 7 to 13 because of the loading presented by the inherently low input impedance of the second triode section 35.

The triode 35 is connected to operate as a grounded grid amplifier, and to this end the grid 54 is maintained at signal ground potential by a capacitor 64 which offers low impedance to signal frequency currents. Grid bias is obtained for the grounded grid triode 35 from the junction of a pair of resistors 61 and 63 which form a voltage divider network between ground and the +B voltage supply terminal. The resistors 61 and 63 are proportioned so that the voltage on the grid 54 is on the order of one half the anode supply voltage of the triode 35. A grid return resistor 68 connects the grid 54 of the triode 35 effectively to its cathode 52 at the anode 37 of the grounded cathode triode 33, since the inductor 50 has negligible impedance for direct current voltages. This connection may be made directly at the cathode 52 if desired. However, for operation at high frequencies, output to input coupling should be kept as low as possible and the most convenient connection circuit is chosen to provide best overall operation.

The resistors 63 and 68 and the tube 33 form a second voltage divider network which has the effect of providing a remote cutoff characteristic for the driven grounded grid amplifier, which is obtained by proper selection of the voltage divider components. In the present amplifier the resistance values used for the resistors 61 and 63 are 1 megohm, and 100,000 ohms respectively. This circuit enable optimum R. F. amplifier operation without necessitating a high AGC voltage or producing cross modulation due to a sharp cutoff characteristic.

For ordinary applications a driven grounded grid amplifier of the type described above produces satisfactory operation while using only a minimum of components, and does not require neutralization. This is because the ground cathode stage has about unity gain, and therefore, the effects of the feedback through the anode to grid capacitance have only a minor effect on the operation of the amplifier. The minor effects are primarily due to changes in AGC potential with changes in signal strength which causes the amount of feedback through the grid-anode capacitance to change thereby producing a variation in the input admittance of the amplifier. This in turn detunes the input circuit thereby producing a variation in the band-pass characteristic of the amplifier. Although these effects are relatively minor, it has been found that for some applications such as for color television, it is preferable to eliminate any such detuning effects insofar as possible.

To this end a pair of switch sections 69 to 70 are provided which include the inductors 71 and 72 between the various switch contacts thereof. Varying portions of the inductors 71 and 72 between the various switch contacts thereof. Varying portions of the inductors 71 and 72 are switched in series with the blocking capacitor 73 between the anode 37 and control grid 40 of the triode 33 for the different television channels. The magnitude of the inductance of the inductors is selected to resonate with the anode-grid capacitance of the tube 33 at the desired channel frequency. In the switch position shown (Channel 2) all of the inductance of the inductors 71 and 72 is connected between the grid 40 and the anode 37 by way of the rotors of switch sections 69 and 70, and the conductor 74. As the signal frequency is increased portions of the inductors 71 and 72 are successively shorted out. The net effect of this circuit is to provide a conventional coil neutralization circuit for each television channel selected.

A tunable output circuit for the driven grounded grid amplifier is coupled to the anode 51 of the grounded grid stage 35. The output circuit comprises a capacitor 76 which is connected in parallel with the inductance from the anode 51 to ground as presented by the inductors connected between the contact terminals of a pair of switch sections 78 and 80. The series combination of anode inductances are connected through a D. C. voltage dropping resistor 83 to a source of polarizing potential +B. The +B voltage is supplied through a switch 95 which is operated by a cam or the channel selector control shaft. In the U. H. F. position, the +B voltage is removed from the tubes 33, 35. A bypass capacitor 82 establishes a signal return path to ground from the lower end of the resistor 83. For tuning through the low frequency channels, the inductors on the switch section 78 are in series with the inductors on the switch section 80, and for high frequency operation the inductors on the switch section 80 are shorted out by the conductor 81.

The tunable output circuit of the driven grounded grid amplifier is coupled to a tunable input circuit for the V. H. F. signal mixer stage 86 by means of low side coupling including a coupling capacitor 85 which is common to both the output circuit of the driven grounded grid amplifier and the input circuit of the mixer, and which is connected to the low side of the inductor in the output circuit of the driven grounded grid amplifier through a D. C. blocking capacitor 84. Signals from the low frequency channels are connected from the output circuit to the capacitor 85 through the rotor of the switch 80 and the conductor 81 while signals from the high frequency channels are coupled through the rotor of the switch section 78 and the contact pin designated by the number 1 on the switch section 78.

The mixer 86 comprises a pentode tube which includes an anode 87, a suppresser grid, a screen grid 88, a control grid 89 and a cathode 90. A tunable input circuit is connected to the control grid 89 of the mixer 86 and includes a tuning capacitor 92 which is connected in parallel with the inductance from the control grid 89 to ground as presented by the inductors connected between the contact terminals of a pair of switch sections, 94 and 96. For the low frequency Channels 2 to 6 the inductors on the switch section 94 are in series with the inductors on the switch section 96, and the D. C. circuit to ground is completed through the grid resistor 98. The signal circuit is completed to ground for low frequency channels through the blocking capacitor 91, the conductor 81, the capacitor 84, and the common coupling capacitor 85. The signal circuit for the high frequency Channels 7 to 13 is completed to ground through a portion of the inductor on the switch section 94 and the common coupling capacitor 85. Coupling is obtained between the R. F. amplifier and mixer stages by the common circulating currents in the capacitor 85. Since the mixer tube 86 is connected in series with the oscillator tube, a resistor 93 is connected between the mixer cathode 90 and the low potential side of the inductors on the switch section 96 to provide a direct current path between the grid 89 and the cathode 90 of the mixer tube.

An oscillator tube 100 is provided which has an anode 102, a control grid 104 and a cathode 106. If desired, the oscillator tube may be in the same envelope as the mixer tube 86 as in a 6V8 type tube which is shown by way of example. Three switches **56*a*, 56*b* and 56*c* are connected in the cathode, anode and grid circuits respectively of the tube 100. These switches are simultaneously operated by a cam on the channel selector control shaft when the channel sector control is moved to or from the U. H. F. position. The switches are shown in the V. H. F. position, and connect the tube 100 for operation as the V. H. F. oscillator. The oscillator is a modified Colpitts type and provides a local oscillation signal for mixing with a received V. H. F. television signal to provide a resultant corresponding intermediate frequency signal which is then fed to the receiver intermediate frequency amplifier for further amplification. The oscillator tank circuit includes an inductor 108 which is distributed successively between the contact terminals of a switch section 110, and is connected between the anode 102 and the grid 104. The switch section 56*b* and a capacitor 112 are connected between the anode 102 and the inductor 108. The capacitor 112 is a D. C. blocking capacitor and permits a larger inductance to be put on the switch, since the effect of a series capacitance is equal and opposite to that of an inductance and therefore additional inductance is required to overcome the effect of the capacitor. The inductor 108 resonates primarily with the capacitors 114 and 116. The capacitor 114 provides a fine tuning control of the oscillator frequency while the capacitor 116 supplements the inherent grid-cathode capacity of the oscillator tube 100**.

A resistor 105 is connected to the grid 104 through the switch section **56*c* to provide a D. C. return path from the grid 104 to the cathode 106**. For V. H. F.

operation the cathode 106 is connected to ground through the switch section *56a*.

It can be noted that the mixer tube 86 and the oscillator tube 100 are connected in series across the source of polarizing potential +B. The anode 102 of the tube 100 is connected through an inductor 121 to the cathode of the mixer tube 86 which cathode is connected through a signal bypass capacitor 123 to ground. The inductor 121 is tuned by the distributed and inherent capacities of the circuit to the television receiver I. F. and provides enough impedance to maintain the oscillator anode 102 sufficiently above signal ground potential to sustain oscillations.

A predetermined amount of oscillator injection from the oscillator tank circuit to the mixer input circuit is provided by the coupling capacitor 118 which is connected between the oscillator anode 102 and the mixer control grid 89. The oscillator signal energy conveyed to the mixer grid 89 is heterodyned with the received V. H. F. signals in the mixer 86 to produce a corresponding difference or I. F. signal in an output circuit of the mixer. A second oscillator injection capacitor 119 is connected between the high signal potential side of the inductor on the switch section 96 in the mixer input circuit and a point on the oscillator tank inductor 108 to supplement the oscillator injection for the low frequency television channels.

The output circuit of the mixer 86 includes a primary winding 120 of an I. F. transformer which is connected between the anode 87 and screen grid 88 of the mixer. A resistor 122 is connected across the primary winding so that the circuit is made relatively broadband. Operating potential for the anode and screen of the mixer tube 86 is supplied from the +B supply which is connected to the low signal potential side of the winding 120. A signal bypass capacitor 126 is connected from the screen grid 88 to ground to provide a low impedance return circuit for signal frequency currents.

A secondary winding 128 of the I. F. transformer is mutually coupled with the primary winding 120. Intermediate frequency signals developed across the secondary winding 128 are conveyed through the transmission line 130 to the television receiver I. F. amplifier, not shown.

The series connected oscillator and mixer tubes provide automatic regulation of the oscillator signal injection into the signal mixer circuit. A condition of tubes or components which would result in an abnormally high oscillator voltage on the mixer tube tends to increase the resistance of the mixer tube with a consequent reduction of oscillator anode to cathode power supply voltage. This is because of a bias voltage which is developed by the rectification of the oscillator signal between the grid and cathode of the mixer, and which is applied to the mixer stage 86.

The circuits described thus far have been directed to the V. H. F. tuner and includes those portions adapted to amplify and convert the received V. H. F. television signals to signals of the receiver I. F. When U. H. F. reception is desired, the switch sections 24, 30, 69, 70, 78, 80, 94, 96, 100, which are ganged for unicontrol operation are rotated by the channel selector control one step counter-clockwise from the Channel 2 position in which they are shown, to the U. H. F. position. In the U. H. F. position, the switches *56a*, *56b* and *56c* are moved from the position shown in solid lines to the position shown in dotted lines, and the switch 95 is moved to the right hand position thereof. This action is accomplished by the action of a cam on the shaft of the channel selector switch as mentioned above. The tubes 86 and 100 are then connected to operate as intermediate frequency amplifiers for the converted U. H. F. signals, the U. H. F. oscillator is energized and the V. H. F. R. F. amplifier tubes 33, 35 are deenergized.

Referring now to the U. H. F. converter shown in

Figure 1, an antenna 140 is connected by way of a twin conductor transmission line which has good performance characteristics through the U. H. F. band to an input coupling winding 142, which at U. H. F. may comprise an inductive loop. The signal selection system for the U. H. F. converter comprises the tunable circuits 144 and 146 which may comprise a pair of concentric line tuners with variable capacity end loading or a tunable transmission line by way of example.

A crystal mixer 148 is connected between a tap on the inductance portion of the tuned circuit 146 and a coupling winding 150. The tap position is selected so that the input impedance presented by the tuned circuit 146 substantially matches the impedance of the crystal mixer 148. A capacitor 149 is connected from the junction of the mixer 148 and the winding 150 to ground. The capacitor is selected to have low impedance to received U. H. F. signal or signals from the U. H. F. oscillator, but presents high impedance to signals at the I. F.

When the channel selector switch is rotated one position counter-clockwise, anode operating potential is supplied to the tube 152 through the switch 95. The U. H. F. oscillator stage has a tunable tank circuit 156 which may comprise a concentric line with variable capacity end loading. Oscillator energy from the tank circuit 156 is coupled into the crystal mixer circuit by a winding 158 which is mutually coupled to the winding 150. The oscillator tank circuit 156 is ganged with the signal selection circuits 144 and 146 for simultaneous tuning.

The intermediate frequency output signal resulting from the heterodyning of a received U. H. F. signal and the U. H. F. local oscillator signal is developed across the primary winding 160 of an amplifier input transformer, which is connected between the top side of the winding 150 and ground. In the U. H. F. position, the switch section *56a* removes the direct connection from cathode 106 to ground, so that the cathode circuit of the tube 100 is completed to ground through a secondary winding 162 which is mutually coupled to the primary winding 160. One side of the secondary winding 162 is connected to the cathode 106 of the tube 100, and the other end of the secondary winding 162 is connected through a cathode biasing resistor 164 which is bypassed by a capacitor 163 to ground. The secondary winding 162 is tuned by the input capacitance of the oscillator 100 to the intermediate frequency of the television receiver which in the present case is about 40 megacycles. However the circuit is relatively broadband due to the inherently low input impedance of the oscillator tube 100, which operates as a grounded grid amplifier at U. H. F.

The switch section *56b* disconnects the anode 102 of the tube 100 from one end of the oscillator tank circuit, and the switch section *56c* switches the grid 104 from the other end of the tank circuit to a source of AGC potential. A capacitor 107 is connected between the AGC lead and ground and is of such a value as to provide a low impedance path to signals of the I. F. thereby effectively grounding the control grid 104 for signals of the I. F. Since the space current paths of the tubes 86 and 100 are in series, the tube 100 acts as an AGC amplifier for the tube 86.

The signals applied to the grounded grid amplifier tube 100 are amplified and developed across an output circuit including the inductor 121 which is tuned by the distributed and inherent capacitances to the television receiver intermediate frequency. The amplified I. F. signal energy is coupled from the anode 102 to the grid 89 of the tube 86 through the capacitor 118. Thus it can be seen that the dual purpose capacitor 118 serves as an injection capacitor when the tube 100 operates as a V. H. F. oscillator, and as a signal coupling capacitor when the tube 100 operates as an I. F. amplifier.

The I. F. signals are then further amplified by the pentode amplifier 86 and developed across the I. F.

output circuit which includes the primary winding 120 of the I. F. transformer. The amplified I. F. signals are then fed to the receiver I. F. strip in the same manner as are the converted V. H. F. signals.

With the oscillator and mixer tubes included in the same envelope, voltages fed back from the output circuit of the tube 86 through various inductive and capacitive paths of the amplifier circuit aggravate any instability of the system. Neutralization can be effected by feeding back to the input circuit of the grounded grid amplifier tube 100 a voltage of substantially equal magnitude and opposite phase to the composite of the voltages fed back through the stray paths. To accomplish this, a pair of inductors 125*a* and 125*b* are serially connected in the filament leads of the tube 100. The inductor 125*a* is connected directly between one of the filament terminals and ground and the inductor 125*b* is connected between the other filament terminal, and the filamentary energizing voltage E. A signal bypass capacitor 127 connects the bottom side of the inductor 125*b* to ground. The effective inductance between the filament and ground is selected so that it forms a series circuit with the composite anode-to-filament capacitance which is resonant at a frequency well above the I. F. This series circuit is effectively connected across the output circuit of the pentode amplifier. At the intermediate frequency this series circuit is capacitive and hence, the voltage across the effective inductance of the inductors 125*a* and 125*b* is 180° out of phase with the voltage in the output circuit. The voltage across the effective inductance of the inductors 125*a* and 125*b* is of opposite phase to that developed by the current flowing in the stray paths. Thus when the voltage across the inductors 125*a* and 125*b* is adjusted for proper amplitude, by proper selection of the frequency of series resonance, and fed through the relatively large filament-to-cathode capacitance to the cathode input circuit, the amplifiers 86 and 100 can be neutralized.

The inductors 125*a*, 125*b* in combination with the filament to ground capacitance effectively forms a parallel resonant circuit. In order that the reactance between the filament and ground be inductive, the parallel circuit must be resonant at a frequency above the intermediate frequency. The extent of the effective inductance appearing between filament and ground is determined by the frequency and resonance of the parallel circuit. As mentioned above it is the effective inductive reactance between the filament and ground which forms the inductive portion of the series resonant circuit which is effectively connected across the output circuit of the tube 86.

Referring now to Figure 2 the operation of the V. H. F.–U. H. F. tuning system of the invention will be discussed. For V. H. F. operation the V. H. F. signal selection circuits 15 are tuned by rotation of the channel selector control to the frequency of the V. H. F. channel to be received. The various switches illustrated in the block diagram of Figure 2 are connected for unicontrol operation and are shown in the V. H. F. position. The selected V. H. F. signals are amplified in the V. H. F. R. F. amplifier 34 and are fed to the V. H. F. mixer 86 and heterodyned with a signal from the V. H. F. local oscillator 100 to produce a corresponding intermediate frequency. The intermediate frequency signals are then fed to the television receiver I. F. amplifier 170 for further amplification before being fed to the video amplifier and second detector 172. An AGC voltage derived from the second detector is fed to the input of the grounded cathode stage 33 to control the gain of the driven grounded grid amplifier in accordance with the received signal strength.

When U. H. F. operation is desired, the channel selector control is turned to the U. H. F. position, and a cam on the channel selector control shaft moves the switches 56*a*, 56*b*, 56*c* and 95 to the alternate position shown in the block diagram. The V. H. F. mixer 86 and oscillator 100 are then connected to operate as I. F. amplifiers, the V. H. F. R. F. amplifier 33, 35 is deenergized, the U. H. F. oscillator 152 is energized, and the output of the U. H. F. converter is connected to the input circuit of the oscillator 100 which now functions as a grounded grid I. F. amplifier. The switch 95 supplies operating potential to the U. H. F. oscillator and the switch 56*a* connects the output from the crystal mixer to the input circuit of the I. F. amplifier 100. The switch 56*c* disconnects the oscillator tank circuit and connects the AGC voltage to the grid of the tube 100.

The U. H. F. signal section circuits 144 are tuned to the frequency of the desired U. H. F. television channel. The selected signal frequencies are heterodyned with signals from the U. H. F. local oscillator 152 in the crystal mixer 148 to produce a corresponding intermediate frequency. This I. F. signal is then fed to the grounded grid stage 100 which then serves as an I. F. amplifier.

The crystal mixed 148 exhibits a relatively low impedance at the intermediate frequency. This impedance which may be represented by a capacitance in parallel with a resistance, changes as the converter circuits are tuned across the U. H. F. band, and also changes with variations in oscillator injection. Heretofore in television tuning systems the crystal mixer 148 has been coupled to the input circuit of the V. H. F. R. F. amplifier 34. The input impedance of the R. F. amplifier stage is much higher than the impedance of the crystal, hence minor variations in the crystal impedance with U. H. F. tuning causes a relatively large variation in the band-pass characteristic of the amplifier. It is to be noted that the band-pass characteristic of the amplifier is a function of the resistance and capacitance.

In accordance with the invention the crystal mixer 148 is coupled with the grounded grid amplifier 100. The input impedance of the grounded grid amplifier 100 is lower than the I. F. impedance of the crystal mixer 148. Hence variations in the mixer impedance have a relatively smaller effect on the band-pass characteristic. In other words, with a grounded cathode amplifier, the loading by the crystal is more severe than the loading by the tube whereas with a grounded grid amplifier the loading by the tube is more severe than the loading by the crystal, hence with the grounded grid stage, the changes in bandwidth due to changes in crystal impedance are much less.

The output of the grounded grid amplifier 100 is coupled to the input of the V. H. F. mixer stage 86 which is also connected to operate as an I. F. amplifier during U. H. F. reception. The amplifier intermediate frequency signals are then fed to the television receiver I. F. strip 170 for amplification in the same manner as previously described for converted V. H. F. signals. AGC potentials derived from the second detector 172 are fed to the input of the grounded grid amplifier 100 to control the gain of this amplifier during U. H. F. reception.

The improved V. H. F.–U. H. F. tuning system described includes dual purpose signal translating stages which operate as a mixer and oscillator for received V. H. F. television signals and as an intermediate frequency amplifier for intermediate frequency signals derived from a U. H. F. converter. This system eliminates additional switching contacts and circuitry in the V. H. F. R. F. amplifier and the accompanying unstabilizing effects thereof. The invention also provides an improved and simplified tuning system wherein low noise amplification is provided for the converted V. H. F. signals and variations in band-pass characteristics of the intermediate frequency amplifier with changes in AGC potential and changes in tuning and the like are minimized.

What is claimed is:

1. A V. H. F.–U. H. F. tuning system for television receivers comprising in combination, a V. H. F. tuner including a radio frequency amplifier having a signal input circuit and a signal output circuit; a signal mixer stage having a tunable signal input circuit and a signal output circuit tuned to the television receiver intermediate frequency; means coupling said mixer input circuit with said radio frequency amplifier output circuit; a dual purpose triode stage; first circuit means including a tunable frequency determining tank circuit for connecting said dual purpose stage as a V. H. F. local oscillator; a U. H. F. converter including a crystal mixer for converting U. H. F. signals into corresponding signals of said intermediate frequency; an intermediate frequency input circuit for said dual purpose stage connected to said crystal mixer; second circuit means including said intermediate frequency input circuit for connecting said dual purpose stage to operate as a grounded-grid intermediate frequency amplifier; channel selector switch means having a U. H. F. converter selecting position and a plurality of V. H. F. station selecting positions for tuning said radio frequency amplifier signal input and output circuits, said mixer input circuit and said frequency determining tank circuit; means actuated by said channel selector switch for selectively establishing said first circuit means in any of the V. H. F. positions of said channel selector switch, and said second circuit means in the U. H. F. converter selecting position of said switch; said mixer input circuit being tuned to the television receiver intermediate frequency in the U. H. F. converter selecting position of said channel selector switch and said mixer tube being thereby operative as an intermediate frequency amplifier; and signal coupling means connected between said dual purpose stage and said mixer input circuit.

2. A V. H. F.–U. H. F. televsion tuning system comprising in combination, a V. H. F. tuner including a radio frequency amplifier; channel selector switch means having a plurality of V. H. F. stations selecting positions for tuning said radio frequency amplifier to select a desired V. H. F. television channel and a U. H. F. converter selecting position; a multi-grid signal mixer stage having a signal input circuit tunable to the frequency of a received V. H. F. signal and to the frequency of the television receiver intermediate frequency; means coupling said signal input circuit with said radio frequency amplifier; a V. H. F. triode local oscillator stage including a frequency determining tank circuit; a capacitor connected between said local oscillator stage and said mixer stage for coupling a signal developed by said oscillator to said mixer stage for mixing with a received V. H. F. television signal to produce a corresponding intermediate frequency; switch means actuated in the U. H. F. position of said channel selector switch to deenergize said radio frequency amplifier, tune said mixer input circuit to the frequency of said television receiver intermediate frequency, disconnect said tunable tank circuit from said triode tube and connect said triode to operate as a grounded grid amplifier; a U. H. F. converter including a crystal mixer for converting U. H. F. signals into corresponding signals of said intermediate frequency; means connecting said grounded grid stage to said crystal mixer in the U. H. F. position of said channel selector switch whereby said grounded grid stage operates as an amplifier for said converted intermediate frequency signals; and means including said capacitor for providing an intermediate frequency signal coupling connection between said grounded grid triode amplifier and said input circuit; said multi-grid tube operative as an intermediate circuit from said triode, anode and control grid, and to frequency amplifier in the U. H. F. position of said channel selector switch.

3. A V. H. F.–U. H. F. television tuning system comprising in combination, a V. H. F. tuner including a radio frequency amplifier having a signal input circuit and a signal output circuit; a signal mixer stage including a pentode having an anode, a cathode and a control grid; a signal input circuit connected to said control grid and tunable to the frequency of a received V. H. F. signal and to the frequency of the television receiver intermediate frequency; means coupling said signal input circuit with said radio frequency amplifier; means for maintaining the cathode of said signal mixer at ground potential; a signal output circuit tuned to the television receiver intermediate frequency connected with said anode; a V. H. F. local oscillator stage including a triode having an anode, a cathode and a control grid; a frequency determining tank circuit connected between the anode and control grid of said triode; means including an inductor tuned to the television receiver intermediate frequency connected between the anode of said triode and the cathode of said pentode to connect the space current paths of said oscillator and mixer tubes in series; signal coupling means connected between said oscillator stage and said mixer stage for coupling a signal developed by said local oscillator to said mixer stage for mixing with a received V. H. F. television signal to provide a corresponding intermediate frequency; channel selector switch means having a U. H. F. converter selecting position and a plurality of V. H. F. station selecting positions for tuning said radio frequency amplifier signal input and output circuits, said mixer input circuit and said oscillator tank circuit; switch means actuated in the U. H. F. position of said channel selector switch to deenergize said radio frequency amplifier, tune said mixer input circuit to the television receiver intermediate frequency whereby said mixer is operative as an intermediate frequency amplifier, and connect said oscillator stage to operate as a grounded grid amplifier; said last named means operable to disconnect said tunable tank circuit from said diode, anode and control grid, and to connect the control grid of said triode at ground potential; a U. H. F. converter including a crystal mixer for converting U. H. F. signals into corresponding signals of said intermediate frequency, and intermediate frequency input circuit for said grounded grid amplifier connected to said crystal mixer; means connecting the cathode of said triode to said intermediate frequency input circuit in the U. H. F. position of said channel selector switch; and means including a capacitor connected between the anode of said triode and the control grid of said pentode for providing a combination signal coupling connection between said tubes in the U. H. F. position of said channel selector switch, and an oscillation injection connection between said tubes in the V. H. F. poistion of said channel selector switch.

4. A V. H. F.–U. H. F. television tuning system comprising in combination, a radio frequency amplifier for received V. H. F. signals, a signal mixer stage having a tunable signal input circuit, means coupling said signal input circuit with said radio frequency amplifier, a dual purpose stage connected with said mixer including a triode tube, first circuit means including a tunable frequency determining tank circuit for connecting said dual purpose stage to operate as a V. H. F. local oscillator, second circuit means for connecting said dual purpose stage to operate as an intermediate frequency amplifier, means providing a signal input connection for said stage for applying intermediate frequency signals to be derived from a preceding U. H. F. converter to said stage, and switch means for selectively establishing said first or said second circuit means in said V. H. F.–U. H. F. tuning system.

5. A V. H. F.–U. H. F. television tuning system comprising in combination, a radio frequency amplifier for received V. H. F. signals, a signal mixer stage having a tunable signal input circuit and a signal output circuit tuned to the television receiver intermediate frequency, means coupling said signal input circuit with said radio frequency amplifier, a dual purpose triode stage, first circuit means for connecting said dual purpose stage to operate as a V. H. F. local oscillator, second circuit means for connecting said dual purpose stage to operate as a grounded-grid intermediate frequency amplifier for signals to be derived from a preceding U. H. F. converter, said last named means including intermediate frequency signal input circuit means, switch means for selectively establishing said first or said second circuit means and simultaneously tuning said mixer signal input circuit to said intermediate frequency when said second circuit means is selected, and signal coupling means connected between said dual purpose and said mixer stages operative as an oscillation injection means with said dual purpose stage connected as a V. H. F. local oscillator or as a signal coupling means with said dual purpose stage connected to operate as an intermediate frequency amplifier.

References Cited in the file of this patent

UNITED STATES PATENTS

| | | |
|---|---|---|
| 2,588,021 | Loughlin | Mar. 4, 1952 |
| 2,596,117 | Bell et al. | May 13, 1952 |
| 2,665,377 | Krepps | Jan. 5, 1954 |
| 2,709,788 | Schmidt | May 31, 1955 |
| 2,715,211 | Murakami | Aug. 9, 1955 |